C. E. HOLLAND.
PROCESS AND APPARATUS FOR RECOVERING METALS FROM LIQUIDS.
APPLICATION FILED DEC. 10, 1913.
1,205,207.
Patented Nov. 21, 1916.
2 SHEETS—SHEET 1.
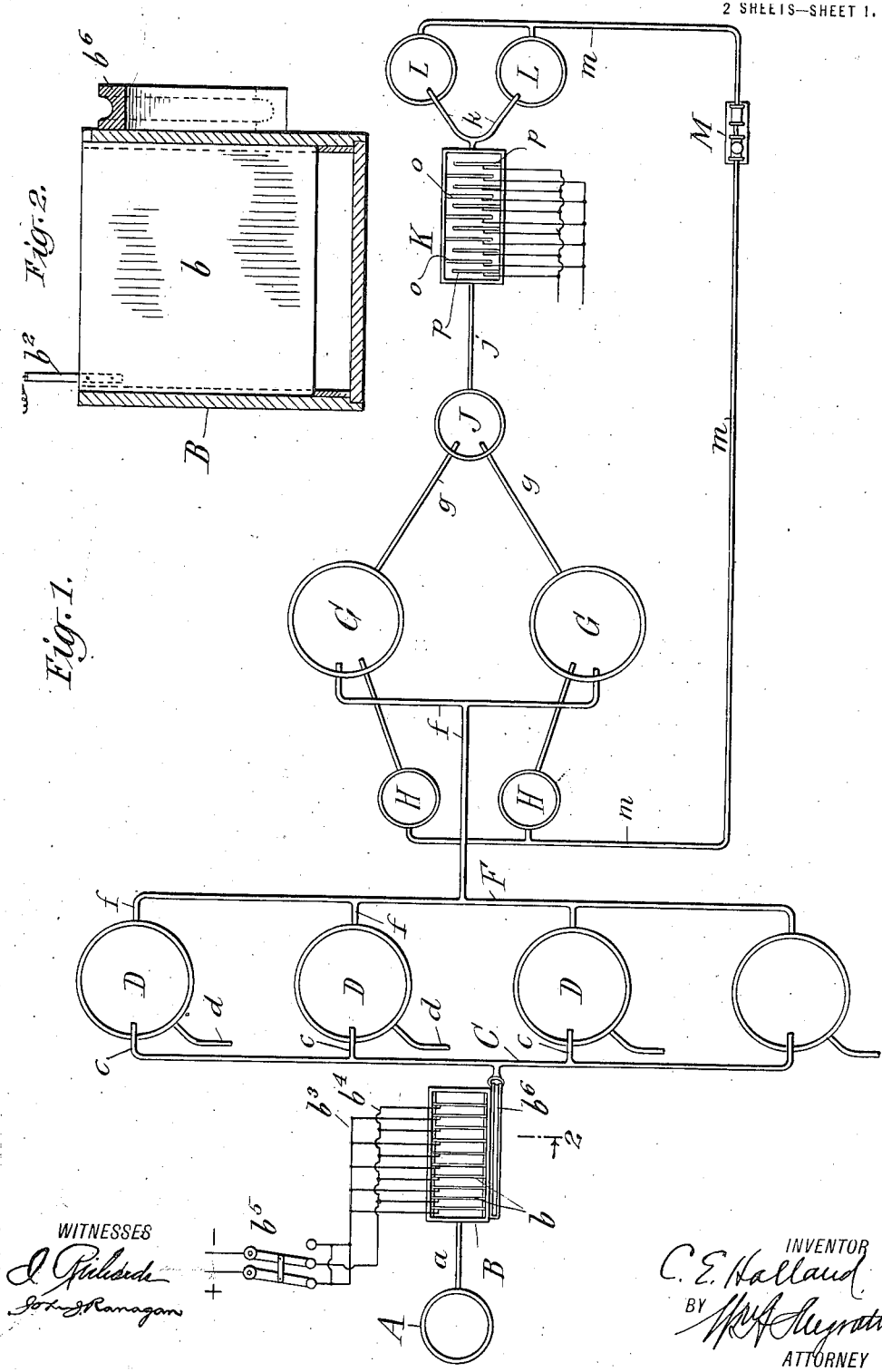

C. E. HOLLAND.
PROCESS AND APPARATUS FOR RECOVERING METALS FROM LIQUIDS.
APPLICATION FILED DEC. 10, 1913.
1,205,207.
Patented Nov. 21, 1916.
2 SHEETS—SHEET 2.
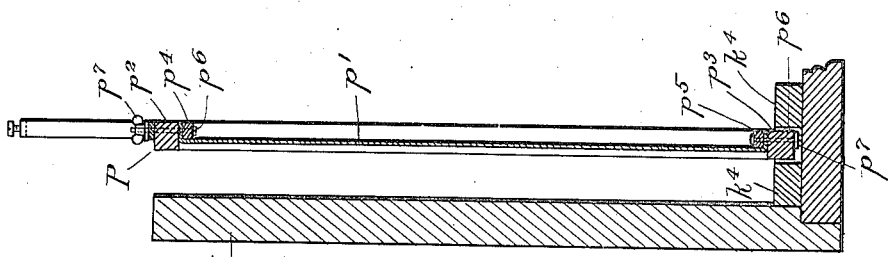
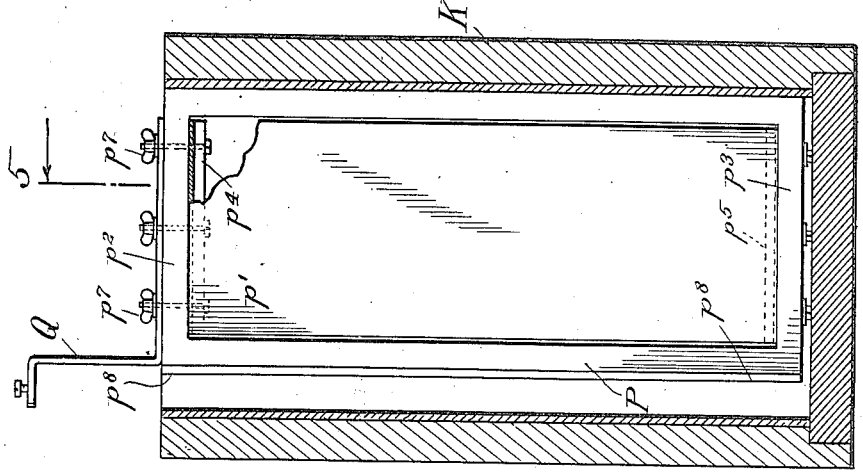
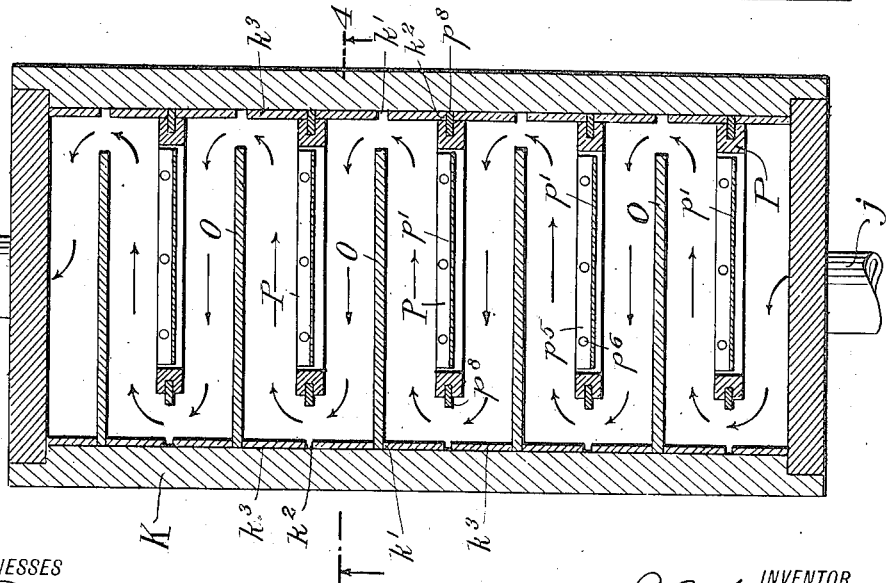
WITNESSES
INVENTOR
C. E. Holland
BY
ATTORNEY

UNITED STATES PATENT OFFICE.

CHARLES E. HOLLAND, OF NEW YORK, N. Y., ASSIGNOR TO METALS ELECTRO-RECOVERY COMPANY, A CORPORATION OF ARIZONA.

PROCESS AND APPARATUS FOR RECOVERING METALS FROM LIQUIDS.

1,205,207.  Specification of Letters Patent.  Patented Nov. 21, 1916.

Application filed December 10, 1913. Serial No. 805,716.

*To all whom it may concern:*

Be it known that I, CHARLES E. HOLLAND, a citizen of the United States, and a resident of the borough of Brooklyn, city and State of New York, have invented certain new and useful Improvements in Processes of and Apparatus for Recovering Metals from Liquids, of which the following is a specification.

My invention is intended to be used in reclaiming and recovering metals in solution or suspension from water or other liquids, liquid solutions and compounds. It is particularly applicable to the recovery of gold and silver from running streams, in the vicinity of gold and silver mines, which usually contain a considerable quantity of gold and silver in suspension and solution which comes from mine, stamping, concentrating, cyanid, smelting or other mills and plants, and which has heretofore been carried away in the water and lost.

One of the objects of my invention is to recover or reclaim from the streams in the vicinity of such mines and mills substantially all the metal which has heretofore been lost, so that there will be no waste or loss whatever.

Other objects will appear from the hereinafter description.

My invention will be fully understood from the foregoing description taken in connection with the accompanying drawing which forms a part of this application.

Referring to the drawing in which the same reference character indicates the same part in the several views: Figure 1 is a plan view showing my improved plant or apparatus diagrammatically. Fig. 2 is a vertical cross sectional view on line 2 of Fig. 1, showing the construction of a precipitating tank on an enlarged scale. Fig. 3 is a horizontal sectional view on an enlarged scale of the precipitating tank. Fig. 4 is a vertical section on line 4—4 of Fig. 3. Fig. 5 is a fragmentary vertical sectional view on line 5 of Fig. 5.

In carrying out my process the solution to be treated is conducted into the collecting tank A, from which it flows by gravity through the pipe $a$, into the bottom of the precipitating tank B, which is provided with a number of plates $b$, made of metal, and as used by me of aluminum, which extend into the tank to within about six inches of the bottom thereof. At their upper ends these plates are provided with connectors $b^2$. The plates are alternately connected to conducting wires $b^3$ and $b^4$ the terminals of which are connected to a pole changer $b^5$, which is operated intermittently to reverse the current in each plate thereby throwing off the metal that has attached itself, the flow of the water intercepting it and thereby carrying a certain part of the metal to the surface before it can reach the other pole. The solution then overflows over the top of the tank and into the trough $b^6$ secured to the side of the tank. From the trough $b^6$ the solution is discharged into a header C which has outlets $c$, which discharge into the settling tanks D. On each pole reverse the force of the water running upward, carries a percentage of the metal to the overflow, so that the machine when stopped has practically nothing on the plates, except that which would gather between the time of shifting the poles. The current agitates the solution to a certain extent, but it is the hydrogen gas which is formed which helps to force the minute particles to rise to the surface. The excess water is drawn off from the tanks D, and discharged by suitable devices $d$, which may lead to a common header not shown. From the settling tanks D the product or settlings flow by gravity through pipes $f$ and header F to the leaching tanks G, where it is subjected to treatment with a cyanid solution supplied from the tanks H. Pipes $g$ carry the solution from the leaching tanks G to the tank J used to accumulate a head or pressure. From this tank the solution passes through the pipe $j$ into the recovery tank K, in which by electrolytic action, the metals are deposited onto sheets of metal, preferably lead foil held in suitable supporting frames hereinafter described. The slimes may be drawn off through pipes $k$ leading to sumps L. A pipe line $m$ in which is a pump M is provided to conduct the liquid part of the slimes from the sumps L back to the solution tanks H where it may be regenerated.

Referring to Fig. 3, it will be seen that the solution in passing through the tank K must flow in a zigzag course owing to the position of the plates O and frame P which form baffles in said tank. These baffles are held in place in the tank K by guides $k'$ and $k^2$ respectively, formed by securing cleats $k^3$ and $k^4$ inside of the tank. Each of the baffles P is made in the form of a rectangular frame having a sheet of material, preferably lead foil $p'$ stretched between its upper and lower ends or cross pieces $p^2$ and $p^3$. Clamp bars $p^4$, $p^5$ are adjustably secured by bolts and nuts $p^6$ and $p^7$ respectively, to the upper and lower cross bars $p^2$ and $p^3$. By this construction the sheet of foil $p'$ is secured to the frame in such manner that it may be readily attached to or removed from the frame when the clean up is made. Each vertical edge of the frame P may be provided with a tongue or feather $p^8$ to fit in the guides $k^2$ to hold the baffle or frame P in its proper position in the tank K. Each frame P is provided on its upper edge with connectors Q which may be connected with a suitable source of electric current. The baffle plates O are made of metal, preferably of aluminum, and are also provided with connectors, not shown, similar to the connectors Q attached to the frames P.

Having now described my invention, what I claim as new and desire to secure by Letters Patent is:

1. The process of recovering or reclaiming metal from water or other liquid which consists in collecting the liquid into an open top receptacle, passing an electric current through the liquid so collected, intermittently reversing the electric current while passing through the liquid causing the liquid to overflow from the receptacle, separating the excess water from the products or settlings treating the products or settlings with a cyanid solution, then subjecting the same to electrolytic action, and then separating the liquid from the electrolytic deposit.

2. The process of recovering or reclaiming metal from water or other liquid which consists in passing an electric current through the liquid, intermittently reversing the electric current while passing through the liquid then causing the liquid to flow from its surface then separating the excess liquid from the products or settlings, treating the settlings with a cyanid solution, separating the metal by electrolytic action from the liquid by electrolytic deposits, and removing the liquid from the electrolytic deposits.

3. The process of recovering or reclaiming metal from water or other liquid, which consists in passing the liquid into and out of a chamber containing a series of electric conductors, passing an electric current through said conductors, intermittently reversing the electric current, thereby forming hydrogen gas which assists the minute particles of metal to rise to the top of the liquid, the flow of liquid also carrying particles of metal to the top while they are in suspension after their release from the electric conductors on reversal of the current, then separating the liquid from the metal so collected, as and for the purpose set forth.

4. In the process of recovering or reclaiming metal from water or other liquid, continually collecting the products or settlings, treating the settlings with a cyanid solution, subjecting the same to electrolytic action, separating the liquid slime from the electrolytic deposit returning the liquid portion to the cyanid solution and re-generating the same.

5. In an apparatus of the class described, a tank to hold water or other liquid containing metal, a tank having a series of plates extending into the same near the bottom thereof, a pipe leading from the first tank to the second tank, a series of electric wires connected to said plates, a pole changer connected to said wires, a trough connected to the side of the tank, a settling tank connected to said trough, a leaching tank, pipes connected to the settling tank and the leaching tank, a tank containing a cyanid solution, pipes connecting the leaching tank with the cyanid tank, a recovering tank, pipes connecting the recovering tank and the leaching tank, a series of anode plates and a series of cathode plates arranged in said recovering tank in baffle formation, electric connections to each series of plates, and an outlet leading from said recovering tank.

6. In an apparatus of the class described, a tank having a series of plates extending into the same near the bottom thereof, a series of electric wires connected to said plates, a pole changer connected to said wires, a settling tank connected to the first mentioned tank, a leaching tank, a pipe connecting the settling tank and the leaching tank, a recovering tank, a pipe connecting the recovering tank and the leaching tank, a series of anode plates and a series of cathode plates arranged in said recovering tank in baffle formation, electric connections to each series of plates, and an outlet pipe leading from said recovering tank.

7. In an apparatus of the class described, a tank having a series of plates extending into the same near the bottom thereof, a series of electric wires connected to said plates, a pole changer connected to said wires, a leaching tank connected to the first mentioned tank, a recovering tank, a pipe connecting the recovering tank and the leaching tank, a series of anode plates and a series of cathode plates arranged in said recovering tank in baffle formation, electric connections to each series of plates, and an outlet from said recovering tank.

8. In an apparatus of the class described, a tank having a series of plates extending into the same near the bottom thereof, a series of electric wires connected to said plates, a pole changer connected to said wires, a recovering tank, connections between the first mentioned tank and the recovering tank, a series of anode plates and a series of cathode plates arranged in said recovering tank in baffle formation, electric connections to each series of plates, and an outlet from said recovering tank.

9. In an apparatus of the class described, a tank, a series of separated anode plates in said tank, a series of cathode frames alternating with said anode plates, each cathode frame having an adjustable bar at each end thereof and a sheet of metal connected to said bars and electric connections suitably connected to each series of plates.

10. In an apparatus of the class described, a tank, a series of separated anode plates in said tank, a series of cathode frames alternating with said anode plates, each cathode frame having an adjustable bar at each end thereof and a sheet of lead-foil connecting said bars and electric connections between each series of plates.

11. In an apparatus of the class described, a tank a series of separated anode plates in said tank, a series of cathode frames alternating with said anode plates, each cathode frame having a bar at each end thereof, a sheet of lead-foil connected to said bars and means connected to said bars and extending through the ends of the frame to adjust said bars.

12. In an apparatus of the class described, a tank, a series of separated anode plates in said tank, a series of cathode frames alternating with said anode plates, each cathode consisting of a rectangular frame having a bar inside of each end thereof, a sheet of lead-foil connected to said bars, bolts connected to the bars and extending to the ends of the frame and nuts for moving said bolts, whereby the bars may be adjusted to loosen or stretch said sheet of foil, and electric connections between each series.

In witness whereof I have hereunto set my hand at borough of Manhattan, city and State of New York, this 28th day of November, 1913.

CHARLES E. HOLLAND.

In presence of—.
JOHN J. RANAGAN,
ISABEL R. RICHARDS.